(12) United States Patent
Cheema et al.

(10) Patent No.: US 12,375,337 B2
(45) Date of Patent: Jul. 29, 2025

(54) APPLYING PRE-FILTERED DFT-S-OFDM

(71) Applicant: Lenovo (Singapore) Pte. Ltd., New Tech Park (SG)

(72) Inventors: Sher Ali Cheema, Ilmenau (DE); Ali Ramadan Ali, Kraiburg am Inn (DE); Ankit Bhamri, Rödermark (DE); Seyedomid Taghizadeh Motlagh, Oberursel (DE); Karthikeyan Ganesan, Kronberg im Taunus (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 59 days.

(21) Appl. No.: 18/552,350

(22) PCT Filed: Mar. 22, 2022

(86) PCT No.: PCT/IB2022/052627
§ 371 (c)(1),
(2) Date: Sep. 25, 2023

(87) PCT Pub. No.: WO2022/201040
PCT Pub. Date: Sep. 29, 2022

(65) Prior Publication Data
US 2024/0187297 A1   Jun. 6, 2024

Related U.S. Application Data

(60) Provisional application No. 63/165,643, filed on Mar. 24, 2021.

(51) Int. Cl.
*H04B 1/525*      (2015.01)
*H04L 27/26*      (2006.01)
*H04W 72/23*      (2023.01)

(52) U.S. Cl.
CPC ....... *H04L 27/26526* (2021.01); *H04W 72/23* (2023.01)

(58) Field of Classification Search
CPC .............. H04L 27/2636; H04L 5/0007; H04L 27/2614; H04L 5/0048; H04L 5/0044;
(Continued)

(56) References Cited

U.S. PATENT DOCUMENTS

2009/0262872 A1\* 10/2009 Prasad ................ H04L 27/2647
                                                                  370/208
2011/0222624 A1\*  9/2011 Sorrentino .......... H04L 27/2627
                                                                  375/295
(Continued)

FOREIGN PATENT DOCUMENTS

JP          2016149642 A      8/2016

OTHER PUBLICATIONS

PCT/IB2022/052627, "International Search Report and the Written Opinion of the International Searching Authority, or the Declaration", International Searching Authority, Jun. 20, 2022, pp. 1-14.
(Continued)

*Primary Examiner* — Eva Y Puente
(74) *Attorney, Agent, or Firm* — Kunzler Bean & Adamson

(57) ABSTRACT

Apparatuses, methods, and systems are disclosed for applying pre-filtered DFT-s-OFDM. One method includes receiving, at a device, an indicator indicating to apply pre-filtered
(Continued)

discrete Fourier transform (DFT) spreading orthogonal frequency division multiplexing (OFDM) (DFT-s-OFDM) for transmission of at least one signal, reception of the at least one signal, or a combination thereof. The method includes, in response to the indicator indicating to apply the pre-filtered DFT-s-OFDM for transmission of the at least one signal, applying a filtering operation in a transmission chain before a DFT operation. The method includes, in response to the indicator indicating to apply the pre-filtered DFT-s-OFDM for reception of the at least one signal, applying the filtering operation in a reception chain after an inverse DFT (IDFT) operation.

20 Claims, 9 Drawing Sheets

(58) Field of Classification Search
CPC ............ H04L 27/2602; H04L 27/2605; H04L 27/2607; H04W 72/23; H04W 72/20; H04W 72/0446; H04W 72/21; H04W 24/10; H04W 72/12; H04W 28/06; H04W 48/12; H04B 7/024; H04B 7/0413; H04B 7/0626; H04B 7/0695; H04B 7/0452; H04B 7/0602; H04B 17/318; H04B 17/336
See application file for complete search history.

(56) References Cited

U.S. PATENT DOCUMENTS

| | | | |
|---|---|---|---|
| 2018/0288749 A1 | 10/2018 | Sun et al. | |
| 2019/0044580 A1* | 2/2019 | Zhou | H04L 5/0051 |
| 2019/0222455 A1 | 7/2019 | Sahin et al. | |
| 2022/0132482 A1* | 4/2022 | Gokceli | H04W 72/044 |

OTHER PUBLICATIONS

Noune et al., "Pre-DFT Tomlinson-Harashima Precoding for SC-FDME", 17th European Signal Processing Conference, IEEE, Aug. 24, 2009, pp. 1-6.

Sahin et al., "DFT-Spread OFDM with Frequency Domain Reference Symbols", IEEE Global Communications Conference, Dec. 2017, pp. 1-6.

3GPP, "3rd Generation Partnership Project; Technical Specification Group Radio Access Network; NR; Physical channels and modulation (Release 16)", 3GPP TS 38.211 V16.4.0, Dec. 2020, pp. 1-133.

3GPP, "3rd Generation Partnership Project; Technical Specification Group Radio Access Network; NR; Physical layer procedures for control (Release 16)", 3GPP TS 38.213 V16.4.0, Dec. 2020, pp. 1-181.

3GPP, "3rd Generation Partnership Project; Technical Specification Group Radio Access Network; NR; Physical layer procedures for data (Release 16)", 3GPP TS 38.214 V16.4.0, Dec. 2020, pp. 1-169.

* cited by examiner

APPLYING PRE-FILTERED DFT-S-OFDM

CROSS-REFERENCE TO RELATED APPLICATIONS

This application claims priority to U.S. Patent Application Ser. No. 63/165,643 entitled "APPARATUSES, METHODS, AND SYSTEMS FOR PRE-FILTERED DFT-S-OFDM WAVEFORM" and filed on Mar. 24, 2021 for Sher Ali Cheema, which is incorporated herein by reference in its entirety.

FIELD

The subject matter disclosed herein relates generally to wireless communications and more particularly relates to applying pre-filtered DFT-s-OFDM.

BACKGROUND

In certain wireless communications networks, DFT-s-OFDM may be used. In such networks, the DFT-s-OFDM may not be flexible and/or may have a high PAPR.

BRIEF SUMMARY

Methods for applying pre-filtered DFT-s-OFDM are disclosed. Apparatuses and systems also perform the functions of the methods. One embodiment of a method includes receiving, at a device, an indicator indicating to apply pre-filtered discrete Fourier transform (DFT) spreading orthogonal frequency division multiplexing (OFDM) (DFT-s-OFDM) for transmission of at least one signal, reception of the at least one signal, or a combination thereof. In some embodiments, the method includes, in response to the indicator indicating to apply the pre-filtered DFT-s-OFDM for transmission of the at least one signal, applying a filtering operation in a transmission chain before a DFT operation. In certain embodiments, the method includes, in response to the indicator indicating to apply the pre-filtered DFT-s-OFDM for reception of the at least one signal, applying the filtering operation in a reception chain after an inverse DFT (IDFT) operation.

One apparatus for applying pre-filtered DFT-s-OFDM includes a device. In some embodiments, the apparatus includes a receiver that receives an indicator indicating to apply pre-filtered discrete Fourier transform (DFT) spreading orthogonal frequency division multiplexing (OFDM) (DFT-s-OFDM) for transmission of at least one signal, reception of the at least one signal, or a combination thereof. In various embodiments, the apparatus includes a processor that: in response to the indicator indicating to apply the pre-filtered DFT-s-OFDM for transmission of the at least one signal, applies a filtering operation in a transmission chain before a DFT operation; and, in response to the indicator indicating to apply the pre-filtered DFT-s-OFDM for reception of the at least one signal, applies the filtering operation in a reception chain after an inverse DFT (IDFT) operation.

Another embodiment of a method for applying pre-filtered DFT-s-OFDM includes transmitting, from a device, an indicator indicating to apply pre-filtered discrete Fourier transform (DFT) spreading orthogonal frequency division multiplexing (OFDM) (DFT-s-OFDM) for transmission of at least one signal, reception of the at least one signal, or a combination thereof. In response to the indicator indicating to apply pre-filtered DFT-s-OFDM for transmission of the at least one signal, a filtering operation in a transmission chain is applied before a DFT operation; and, in response to the indicator indicating to apply pre-filtered DFT-s-OFDM for reception of the at least one signal, the filtering operation in a reception chain is applied after an inverse DFT (IDFT) operation.

Another apparatus for applying pre-filtered DFT-s-OFDM includes a device. In some embodiments, the apparatus includes a transmitter that transmits an indicator indicating to apply pre-filtered discrete Fourier transform (DFT) spreading orthogonal frequency division multiplexing (OFDM) (DFT-s-OFDM) for transmission of at least one signal, reception of the at least one signal, or a combination thereof. In response to the indicator indicating to apply pre-filtered DFT-s-OFDM for transmission of the at least one signal, a filtering operation in a transmission chain is applied before a DFT operation; and, in response to the indicator indicating to apply pre-filtered DFT-s-OFDM for reception of the at least one signal, the filtering operation in a reception chain is applied after an inverse DFT (IDFT) operation.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
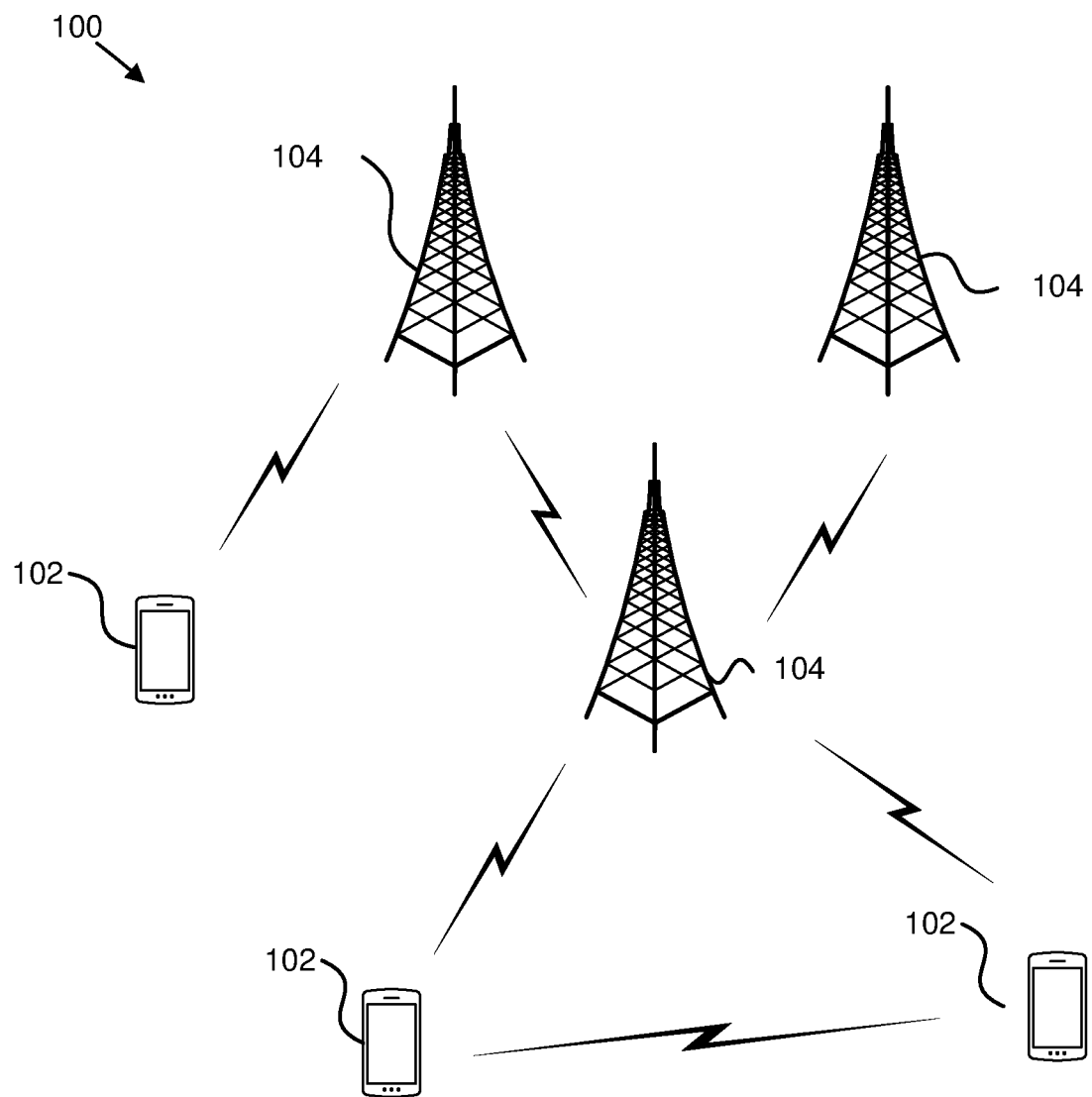
FIG. 1 is a schematic block diagram illustrating one embodiment of a wireless communication system for applying pre-filtered DFT-s-OFDM.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for applying pre-filtered DFT-s-OFDM. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfox, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 and/or a network unit 104 may receive, at a device, an indicator indicating to apply pre-filtered discrete Fourier transform (DFT) spreading orthogonal frequency division multiplexing (OFDM) (DFT-s-OFDM) for transmission of at least one signal, reception of the at least one signal, or a combination thereof. In some embodiments, the remote unit 102 and/or the network unit 104 may, in response to the indicator indicating to apply the pre-filtered DFT-s-OFDM for transmission of the at least one signal, apply a filtering operation in a transmission chain before a DFT operation. In certain embodiments, the remote unit 102 and/or the network unit 104 may, in response to the indicator indicating to apply the pre-filtered DFT-s-OFDM for reception of the at least one signal, apply the filtering operation in a reception chain after an inverse DFT (IDFT) operation. Accordingly, the remote unit 102 and/or the network unit 104 may be used for applying pre-filtered DFT-s-OFDM.

In certain embodiments, a remote unit 102 and/or a network unit 104 may transmit, from a device, an indicator indicating to apply pre-filtered discrete Fourier transform (DFT) spreading orthogonal frequency division multiplexing (OFDM) (DFT-s-OFDM) for transmission of at least one signal, reception of the at least one signal, or a combination thereof. In response to the indicator indicating to apply pre-filtered DFT-s-OFDM for transmission of the at least one signal, a filtering operation in a transmission chain is applied before a DFT operation; and, in response to the indicator indicating to apply pre-filtered DFT-s-OFDM for reception of the at least one signal, the filtering operation in a reception chain is applied after an inverse DFT (IDFT) operation. Accordingly, the remote unit 102 and/or the network unit 104 may be used for applying pre-filtered DFT-s-OFDM.

Figure 2:
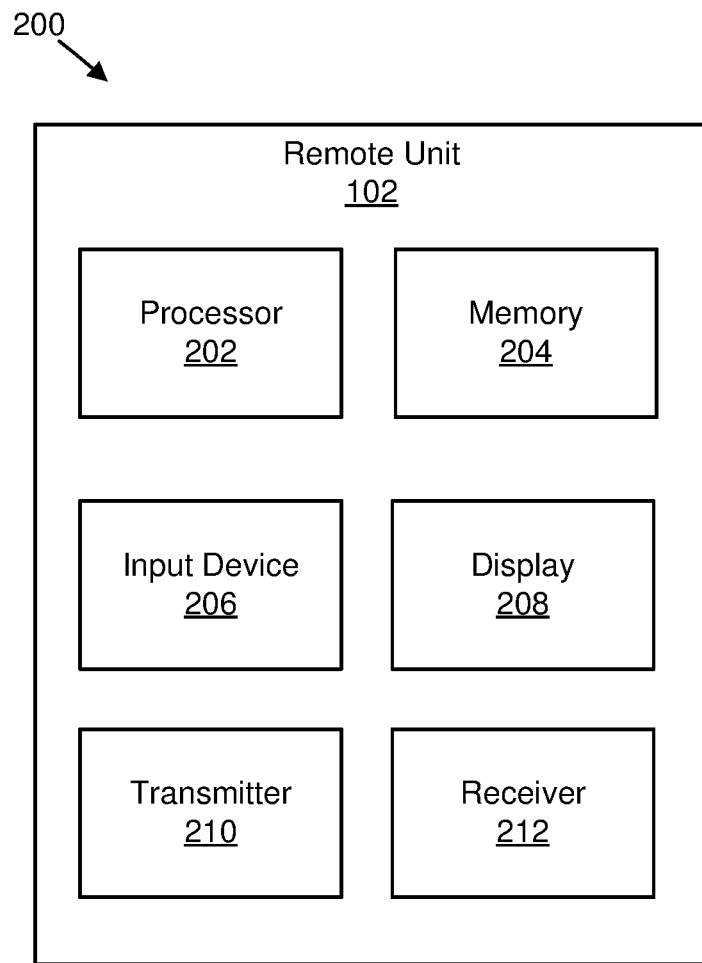
FIG. 2 is a schematic block diagram illustrating one embodiment of an apparatus that may be used for applying pre-filtered DFT-s-OFDM.

FIG. 2 depicts one embodiment of an apparatus 200 that may be used for applying pre-filtered DFT-s-OFDM. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the receiver 212 receives an indicator indicating to apply pre-filtered discrete Fourier transform (DFT) spreading orthogonal frequency division multiplexing (OFDM) (DFT-s-OFDM) for transmission of at least one signal, reception of the at least one signal, or a combination thereof. In various embodiments, the processor 202: in response to the indicator indicating to apply the pre-filtered DFT-s-OFDM for transmission of the at least one signal, applies a filtering operation in a transmission chain before a DFT operation; and, in response to the indicator indicating to apply the pre-filtered DFT-s-OFDM for reception of the at least one signal, applies the filtering operation in a reception chain after an inverse DFT (IDFT) operation.

In some embodiments, the transmitter 210 transmits an indicator indicating to apply pre-filtered discrete Fourier transform (DFT) spreading orthogonal frequency division multiplexing (OFDM) (DFT-s-OFDM) for transmission of at least one signal, reception of the at least one signal, or a combination thereof. In response to the indicator indicating to apply pre-filtered DFT-s-OFDM for transmission of the at least one signal, a filtering operation in a transmission chain is applied before a DFT operation; and, in response to the indicator indicating to apply pre-filtered DFT-s-OFDM for reception of the at least one signal, the filtering operation in a reception chain is applied after an inverse DFT (IDFT) operation.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
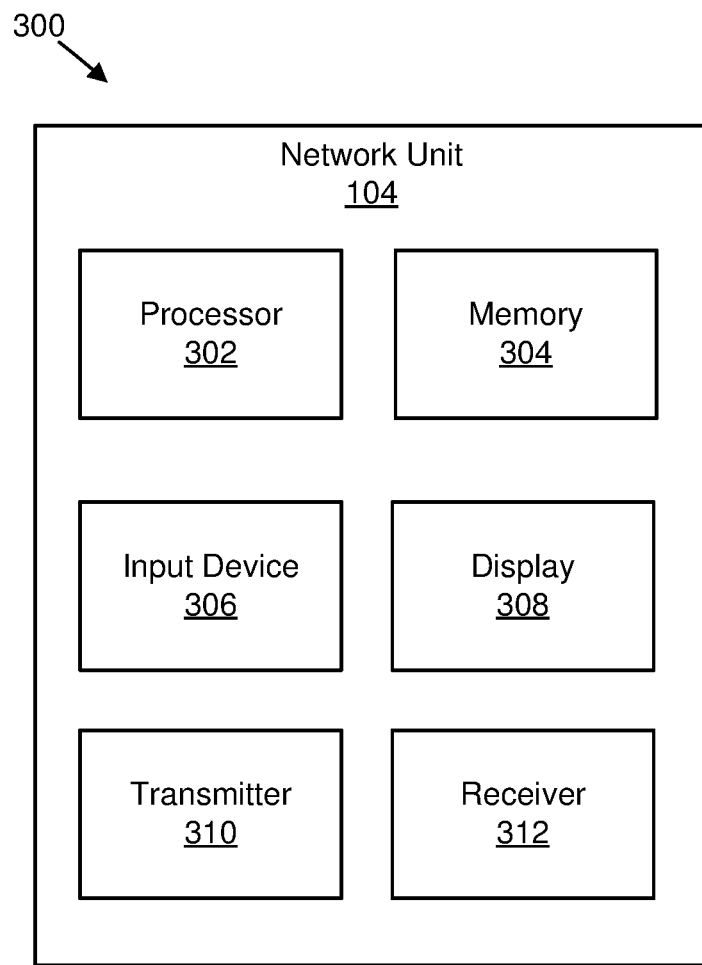
FIG. 3 is a schematic block diagram illustrating one embodiment of an apparatus that may be used for applying pre-filtered DFT-s-OFDM.

FIG. 3 depicts one embodiment of an apparatus 300 that may be used for applying pre-filtered DFT-s-OFDM. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the receiver 312 receives an indicator indicating to apply pre-filtered discrete Fourier transform (DFT) spreading orthogonal frequency division multiplexing (OFDM) (DFT-s-OFDM) for transmission of at least one signal, reception of the at least one signal, or a combination thereof. In various embodiments, the processor 302: in response to the indicator indicating to apply the pre-filtered DFT-s-OFDM for transmission of the at least one signal, applies a filtering operation in a transmission chain before a DFT operation; and, in response to the indicator indicating to apply the pre-filtered DFT-s-OFDM for reception of the at least one signal, applies the filtering operation in a reception chain after an inverse DFT (IDFT) operation.

In some embodiments, the transmitter 310 transmits an indicator indicating to apply pre-filtered discrete Fourier transform (DFT) spreading orthogonal frequency division multiplexing (OFDM) (DFT-s-OFDM) for transmission of at least one signal, reception of the at least one signal, or a combination thereof. In response to the indicator indicating to apply pre-filtered DFT-s-OFDM for transmission of the at least one signal, a filtering operation in a transmission chain is applied before a DFT operation; and, in response to the indicator indicating to apply pre-filtered DFT-s-OFDM for reception of the at least one signal, the filtering operation in a reception chain is applied after an inverse DFT (IDFT) operation.

It should be noted that one or more embodiments described herein may be combined into a single embodiment.

In certain embodiments, such as in new radio ("NR"), multi-carrier (e.g., cyclic prefix ("CP") orthogonal frequency division multiplexing ("OFDM") ("CP-OFDM")) based waveform is used for downlink ("DL") as well as for uplink ("UL") and additionally single carrier (e.g., discrete Fourier transform ("DFT") spread ("s") OFDM ("DFT-s-OFDM")) may be used for UL. However, CP-OFDM performance may degrade at high frequencies (e.g., beyond 52.6 GHZ) due to its sensitivity to phase noise and its high peak to average power ratio ("PAPR") or cubic metric ("CM") that limits the cell coverage, edge of cell performance, and higher user equipment ("UE") power consumption. The problems of CP-OFDM at high frequencies may become severe as the modulation order and/or the channel bandwidth increases. A single carrier waveform, such as DFT-s-OFDM, may be used at high frequencies due to its natural robustness against phase noise and its low PAPR or CM.

In some embodiments, multiplexing different channels and/or signals on a same DFT-s-OFDM symbol may be performed. Multi DFT-s-OFDM or multiplexing DFT-s-OFDM and CP-OFDM waveforms may be used to have frequency domain multiplexed symbols, but at the cost of increasing PAPR and low flexibility for mapping. In various embodiments, it may be indicated how to adopt DFT-s-OFDM such that different channel and/or signals are multiplexed such as using demodulation reference signals ("DMRSs" or "DM-RSs") or channel state information ("CSI") reference signals ("RSs") ("CSI-RSs") with full flexibility while keeping the PAPR as low as possible compared to CP-OFDM.

In certain embodiments, there may be a new filtered DFT-s-OFDM technique which provides flexibility to multiplex different channels and/or signals while having comparable or low PAPR as compared to a classical DFT-s-OFDM and multi DFT-s-OFDM techniques.

In some embodiments, the following may be used for pre-filtered DFT-s-OFDM: 1) design of pre-filtering matrices to generate multiplex data streams; 2) multiplexing of data with DM-RS for different channels and/or signals; 3) multiplexing of physical downlink shared channel ("PDSCH") with CSI-RS; 4) multiplexing of physical uplink shared channel ("PUSCH") with sounding reference signal ("SRS"); 5) non-contiguous frequency domain resource allocation for PDSCH and PUSCH; 6) signaling and/or determination of pre-filtering matrices at a receiver; 7) multiplexing UEs in DL; and/or 7) multiplexing a synchronization signal block ("SSB") with a control resource set ("CORESET") (e.g., CORESET #0).

In a first embodiment, there may be a pre-DFT filter matrix design. According to the first embodiment, DFT-s-OFDM is pre-filtered in such a way that either zeros or desired reference symbols at the desired location are achieved at the output of DFT. This is accomplished by pre-multiplying the DFT with a matrix that achieves this goal. A high-level illustration of the pre-filtered DFT-s-OFDM concept is shown in FIG. 4.

Figure 4:
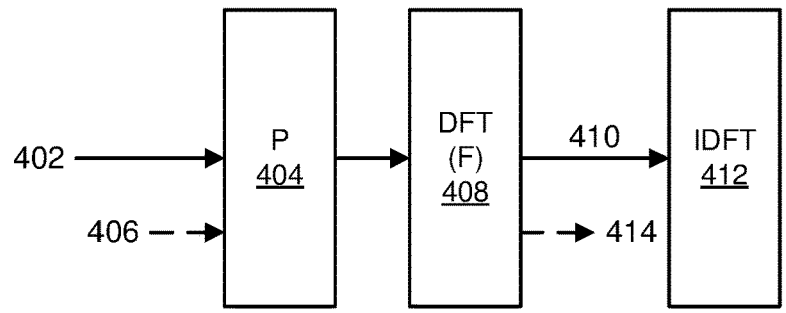
FIG. 4 is a schematic block diagram illustrating one embodiment of a system for pre-filtered DFT-s-OFDM.

FIG. 4 is a schematic block diagram illustrating one embodiment of a system 400 for pre-filtered DFT-s-OFDM. The system 400 includes a data stream 402 being provided to a pre-filtered matrix 404 (P). A RS 406 may also be provided to the P 404. The P 404 provides an output to a DFT 408 (F) which outputs data samples 410 to an inverse DFT ("IDFT") 412. Moreover, the F 408 may output a RS 414.

In one embodiment, a pre-filtered matrix P is designed to get zeros at the output of N point DFT. The location of zeros is set according to the desired reference symbol location. In a second step, the reference symbols are added at the zero location and then an M point IDFT is applied to have time domain data, expressed as $$FPd = \begin{bmatrix} x_d \\ 0 \end{bmatrix}, \begin{bmatrix} x_d \\ 0 \end{bmatrix} + \begin{bmatrix} 0 \\ x_{rs} \end{bmatrix} = \begin{bmatrix} x_d \\ x_{rs} \end{bmatrix}.$$

Here F, P, and d indicate the DFT matrix, pre-filtering matrix, and data symbol vector, respectively, whereas $x_d$ and $x_{rs}$ are the data samples at the output of the DFT and reference symbols that need to be sent.

Figure 5:
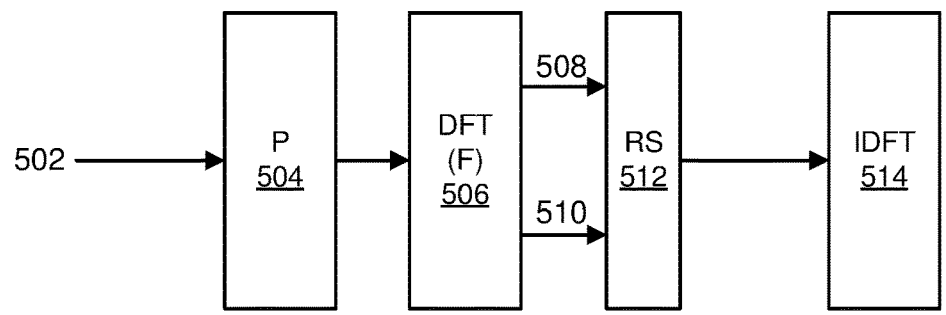
FIG. 5 is a schematic block diagram illustrating one embodiment of a system for a two-step procedure to design a pre DFT filtering matrix.

FIG. 5 is a schematic block diagram illustrating one embodiment of a system 500 for a two-step procedure to design a pre DFT filtering matrix. The system 500 includes a data stream 502 being provided to a pre-filtered matrix 504 (P). The P 504 provides an output to a DFT 506 (F) which outputs a first output 508 and a second output 510 to a RS 512. The RS 512 provides output to an IDFT 514.

A simple design to achieve zeros at the output of DFT may be achieved as: $P \in \text{null}\{F\}_{rows\ corsp\ to\ zeros\ location}$. Such implementation may be useful since it can result in an orthogonal matrix that in return simplifies a simple receiver architecture (e.g., a matched filter-based post filtering may be applied at the receiver, i.e., $P^H \cdot P = I$, where I denotes an identity matrix).

In certain embodiments, a pre-filtered matrix is designed so that desired reference symbols at an output of a DFT are made along with data samples. The location of the reference symbols may be considered while designing the pre-filtered matrix. Such an implementation may be useful since reference symbol are not added in a time domain, and the reference symbols are received at a desired location.

In some embodiments, assume that d represents data symbols before DFT, and $t_{rs}$ represents some additional symbols before DFT. Then, the desired symbols at the output of the DFT can be written as:

$$F \begin{bmatrix} d \\ t_{rs} \end{bmatrix} = \begin{bmatrix} x_d \\ x_{rs} \end{bmatrix},$$

where F is the DFT matrix. Then, the F matrix is factorized as:

$$F = X = \begin{bmatrix} X_{11} & X_{12} \\ X_{21} & X_{22} \end{bmatrix},$$

where sub matrices are selected so that the lower submatrices $X_{21}$ and $X_{22}$ correspond to the rows of matrix F where the reference symbols are needed at the DFT output. Therefore, $$\begin{bmatrix} X_{11} & X_{12} \\ X_{21} & X_{22} \end{bmatrix} \begin{bmatrix} d \\ t_{rs} \end{bmatrix} = \begin{bmatrix} x_d \\ x_{rs} \end{bmatrix}.$$

To find the unknown $t_{rs}$, using the above relationship, $x_{rs} = X_{21}d + X_{22}t_{rs}$, and $t_{rs} = X_{22}^{-1}(x_{rs} - X_{21}d)$. Then, using the $t_{rs}$ vector, $$X \left( \begin{bmatrix} I \\ T \end{bmatrix} d + \begin{bmatrix} 0 \\ X_{22}^{-1} \end{bmatrix} x_{rs} \right) = \begin{bmatrix} x_d \\ x_{rs} \end{bmatrix},$$

where $T = X_{22}^{-1} X_{21}$. An illustration of this approach is shown in FIG. 6.

Figure 6:
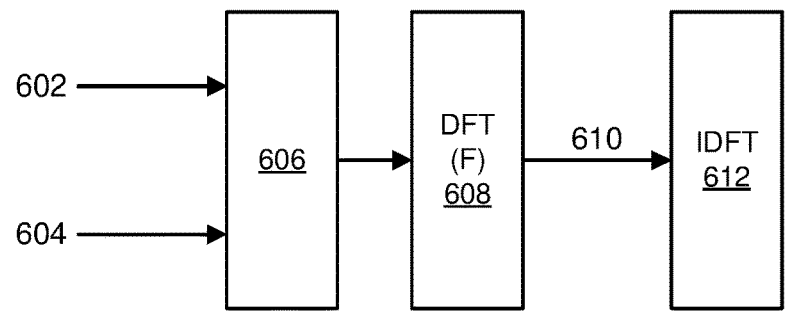
FIG. 6 is a schematic block diagram illustrating one embodiment of a system for a direct approach to a pre DFT filtering matrix.

Specifically, FIG. 6 is a schematic block diagram illustrating one embodiment of a system 600 for a direct approach to design a pre DFT filtering matrix. The system 600 includes a data stream 602 and a reference symbol 604 ($x_{rs}$) being provided to a multiplexer 606 which multiplexes $$\begin{bmatrix} I \\ T \end{bmatrix}$$

from the data stream 602 and $$\begin{bmatrix} 0 \\ X_{22}^{-1} \end{bmatrix}$$

from the reference symbol 604. The multiplexer 606 provides output to a DFT 608 (F). The F 608 provides an output $$610 \left( \begin{bmatrix} x_d \\ x_{rs} \end{bmatrix} \right)$$

to an IDFT 612. Such sort of design may result in a high energy of data samples at an output of the DFT 608, resulting in high PAPR. Therefore, in one implementation, an additional matrix L may be pre-multiplied with DFT matrix to achieve a lower PAPR. If such a matrix is used, then the design of pre-filtering matrix is achieved by using X as shown in the following, and then following the same steps that are discussed above:

$$FL = X = \begin{bmatrix} X_{11} & X_{12} \\ X_{21} & X_{22} \end{bmatrix}.$$

It should be noted that a design of a pre-filtering matrix may be independent of data symbols or reference symbols. It may only depend on a size of a DFT matrix and a location of reference symbols.

In various embodiments, different designs and combinations yield different PAPR and have different complexity. Therefore, for different system requirements, different design of pre-filtering matrices may be achieved such that they not only reduce PAPR but also gives the flexibility for multiplexing reference symbols and data at any desired location.

In certain embodiments, only one type of pre-filtering matrices (e.g., designed for a fixed DFT size and position of reference symbols) is used for some type of application scenarios (e.g., only one type is used for multiplexing DM-RS and control data for CORESET or for multiplexing PBCH and DM-RS for SSB). In some embodiments, multiple pre-filtering matrices (e.g., designed for a fixed DFT size and position of reference symbols) are used for different signaling aspects. All of these pre-filtering matrices may be indicated in a specification. Based on a system requirement, such as complexity or PAPR, one of the matrices is selected for specific signaling aspects. In various embodiments, if a UE is configured to apply pre-filtered DFT-s-OFDM but not indicated with a specific type, then a default pre-filtered matrix is applied. In one implementation, the default pre-filtered matrix generates a combination of zeros and nonzero resource elements ("REs") (e.g., used for transmission of that channel and/or signal).

In certain embodiments, a design of filters P and L is extended to a non-linear space of functions. In some embodiments, a design of filters P and L may be done via an adaptive learning strategy. In one implementation, a design of filters P and L may be relaxed such that the null-space property, as well as are satisfied only approximately, but at the benefit of achieving a lower PAPR or some other desired metrics. In various embodiments, an index or a compressed version of the learned filtering strategy is transferred to the receiver.

In a second embodiment, there may be a pre-filtered DFT-s-OFDM for multiplexing data and DM-RS for different downlink channels and/or signals. According to the second embodiment, pre-filtered DFT-s-OFDM is used to multiplex control data or any other data and DM-RS in one symbol, where DM-RS may be spread across multiple RBs. This may be achieved by applying only one DFT operation. This sort of implementation not only gives flexibility to multiplex data and DM-RS but also results in reduced PAPR in many cases as compared to the multi DFT-s-OFDM.

In certain embodiments, control data and DM-RS for each CORESET may be multiplexed in one symbol using a single pre-filtered DFT operation. The position of DM-RS and the range of frequency domain resources for CORESET is generally fixed, so a number of pre-filtering matrices may be designed for a number of DFT sizes and associated positions of DM-RS. In one implementation, only one type of matrix is specified to generate multiplexed control data and DM-RS for a CORESET configuration. In another implementation, multiple filtering matrices are designed for the same CORESET configuration parameters. Having multiple filters adds flexibility to the system as different filters may be chosen, based on a UE and/or system requirement (e.g., PAPR, complexity, and so forth). On the other hand, having only one filtering matrix reduces the system complexity, signaling overhead, and memory requirements. In another implementation, each search space and DM-RS may be multiplexed using a single pre-filtered DFT operation. In another implementation, the same pre-filtering matrix may be applied for 'N' CORESET or 'M' search spaces in a slot. In such a case, the UE is provided and indication through downlink control information ("DCI"), a medium access control ("MAC") control element ("CE") ("MAC CE"), or semi-statically configured through radio resource control ("RRC") signaling mechanism about a choice of a filtering matrix.

In some embodiments, physical broadcast channel ("PBCH") data and DM-RS symbols are multiplexed using pre-filtered DFT-s-OFDM. In one implementation, the position of DM-RS may be kept the same that used for CP-OFDM. In various embodiment, a PDSCH, DM-RS, and a CORESET may be multiplexed using a single pre-filtered DFT operation.

In a third embodiment, there may be a multiplexing of pre-filtered DFT-s-OFDM PDSCH with CSI-RS symbols. According to the third embodiment, pre-filtered DFT-s-OFDM is used for multiplexing PDSCH with CSI-RS in a symbol using a single DFT operation. The DFT length is kept the same while filtering matrix size changes. In symbols where only PDSCH is transmitted, the filtering matrix is an identity matrix, while for PDSCH and CSI-RS multiplexed symbol, the filtering matrix depends on a design choice. In one implementation, if a two step procedure is adopted, zeros are generated at the desired positions of CSI-RS and CSI-RS are inserted in the frequency domain. In one implementation, CSI-RS symbols are directly generated at desired frequency positions using a different filtering matrix design.

Figure 7:
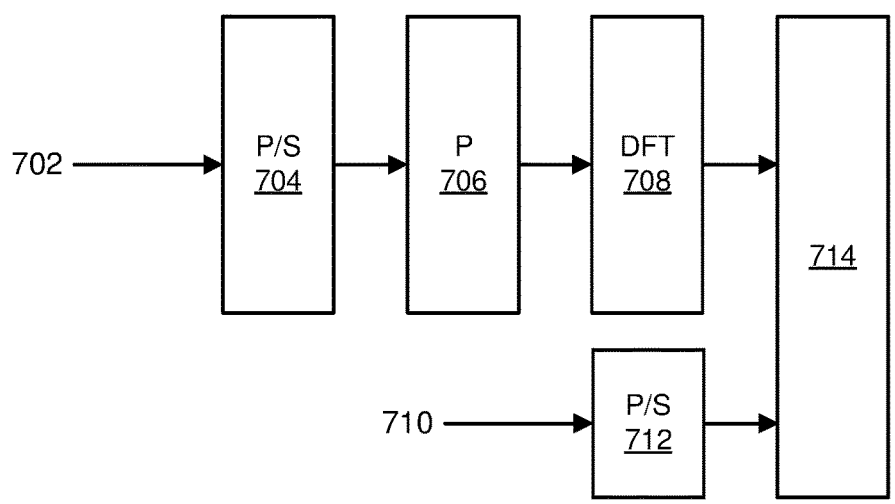
FIG. 7 is a schematic block diagram illustrating one embodiment of a system for multiplexed PDSCH and CSI-RS using pre-filtered DFT-s-OFDM (e.g., using a two step procedure)

FIG. 7 is a schematic block diagram illustrating one embodiment of a system 700 for multiplexed PDSCH and CSI-RS using pre-filtered DFT-s-OFDM (e.g., using a two step procedure). The system 700 includes a PDSCH 702 being provided to a serial to parallel conversion ("P/S") 704. The P/S 704 provides output to a P 706 which provides an output to a DFT 708. The system 700 also includes a CSI-RS 710 being provided to a P/S 712. The DFT 708 and the P/S 712 provide outputs that are multiplexed 714.

Figure 8:
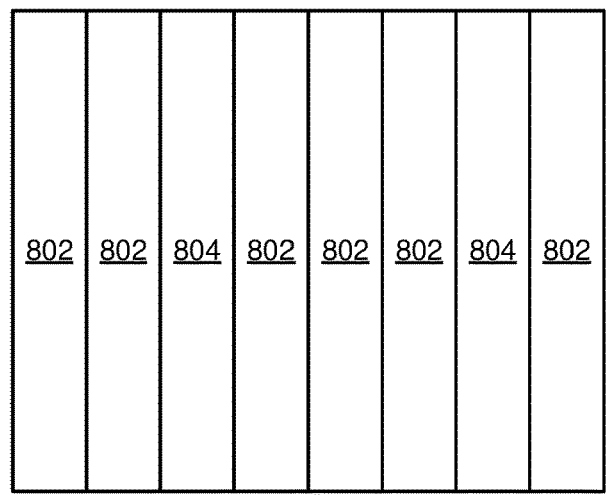
FIG. 8 is a schematic block diagram illustrating one embodiment of a timing diagram for multiplexed PDSCH and CSI-RS using pre-filtered DFT-s-OFDM (e.g., using a two step procedure)

FIG. 8 is a schematic block diagram illustrating one embodiment of a timing diagram 800 for multiplexed PDSCH and CSI-RS using pre-filtered DFT-s-OFDM (e.g., using a two step procedure). The timing diagram 800 includes PDSCH 802 when P=I (e.g., I being an identity matrix) and multiplexed PDSCH with CSI-RS 804 when P is not equal to I.

In one embodiment, if zero power CSI-RS is multiplexed with the PDSCH or PDCCH, a two-step filtering matrix may be designed to generate zeros at the desired location.

In a fourth embodiments, there may be pre-filtered DFT-s-OFDM with non-contiguous frequency domain resource allocation for PDSCH and/or PUSCH. In some embodiments, uplink resource allocation scheme type 0 is supported for PUSCH only if transform precoding is disabled. Uplink resource allocation scheme type 1 and type 2 may be supported for PUSCH if transform precoding is enabled or disabled. In various embodiments, non-contiguous frequency domain resource allocation is not supported if a DFT-s-OFDM waveform is configured to UE.

According to the fourth embodiment, if a UE is configured with pre-filtered DFT-s-OFDM for DL and/or UL, then non-contiguous frequency domain resource allocation may be configured to the UE, wherein the pre-filtered matrix can be determined at the receiver nodes based on a bitmap indicating resource block groups ("RBGs") that are allocated to the scheduled UE. If the bitmap indicates '0' for RBG, then it implies that the resources within that RBGs are not allocated and as a result the pre-filtered matrix will be determined such that zeros are places on the corresponding resources that are not allocated to the UE.

In one implementation, uplink resource allocation type 0, type 1, and type 2 can be configured to the UE if pre-filtered DFT-s-OFDM is configured to the UE for PUSCH. In another implementation, both downlink resource allocation type 0 and type 2 can be configured to the UE if pre-filtered DFT-s-OFDM is configured to the UE for PUSCH.

In a fifth embodiment, there may be multiplexing of pre-filtered DFT-s-OFDM PUSCH with a SRS. According to the fifth embodiment, pre-filtered DFT-s-OFDM is used for multiplexing PUSCH with SRS in a symbol using a single DFT operation. The DFT length is kept the same while a filtering matrix size changes. In symbols, where only PUSCH is transmitted, the filtering matrix is an identity matrix, while for a PUSCH and SRS multiplexed symbol, the filtering matrix depends on a design choice. In one implementation, if a two step procedure is used, zeros are generated at the desired positions of SRS and SRS is inserted in the frequency domain. In another implementation, SRS symbols are directly generated at desired frequency positions using a different filtering matrix design.

In a sixth embodiment, there may be switching to pre-filtered DFT-s-OFDM with an offset. According to the sixth embodiment, if a UE is indicated by a network to switch from one waveform type (not pre-filtered DFT-s-OFDM) to pre-filtered DFT-s-OFDM for transmitting and/or receiving one or more channels and/or signals, then the UE is not expected to apply the pre-filtered DFT-s-OFDM before the time offset configured by a network is reached where the offset is basically the time after receiving the indication to switch the waveform and before the start of transmission and/or reception of a channel and/or a signal for which the pre-filtered DFT-s-OFDM is indicated. As such, it allows the UE to prepare for a matrix and/or filter corresponding to the channel, signal transmission, and/or reception with pre-filtered DFT-s-OFDM.

In one implementation, switching may be implicitly triggered to pre-filtered DFT-s-OFDM if there is a change in a configured and/or indicated value for one or more of the following: 1) SCS value; 2) frequency range; 3) bandwidth part ("BWP") size; and/or 4) BWP index switching.

In a seventh embodiment, there may be multiplexing of multiple UEs with a single pre-filtered DFT. According to the seventh embodiment, pre-filtered DFT-s-OFDM is used for multiplexing PDSCH of multiple UEs. A single pre-filtering matrix is used for pre-filtering the time domain data of multiple UEs and a single DFT is performed on the output of the pre-filtering stage. This results in a reduced PAPR compared to the separate DFTs performed on the data of each scheduled UE. The pre-filtering matrix is designed to guarantee that the output of the single DFT results with the desired frequency domain allocation in terms of the number and the locations of the configured RBs of each UE. The base station may group the UEs to be scheduled and each group contains a 'N' UEs with one DFT and one pre-filtering operation depending on the required PAPR, UE receiver complexity, and the signaling overhead restrictions. The UE receives the configuration from the base station regarding the performed pre-filtering. In one implementation, the UE is signaled in DCI with the DFT length used for multiplexing the group of UEs it belongs to and the frequency allocation for each UE to regenerate the pre-filtering matrix. In another implementation, the UE receives an indication of the pre-filtering matrix used at the gNB of that group of UEs.

Figure 9:
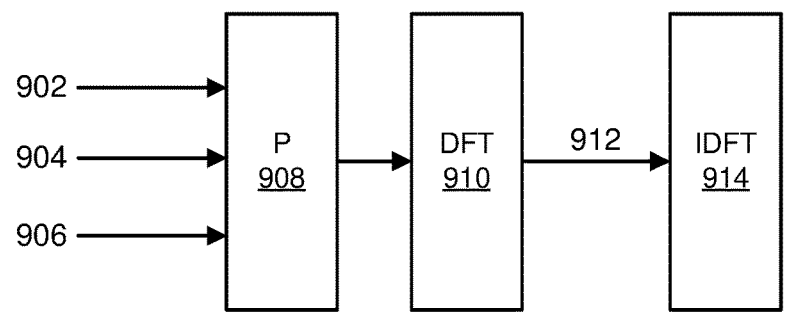
FIG. 9 is a schematic block diagram illustrating one embodiment of a system for UEs multiplexing with a single DFT using pre-filtered DFT-s-OFDM.

FIG. 9 is a schematic block diagram illustrating one embodiment of a system 900 for UEs multiplexing with a single DFT using pre-filtered DFT-s-OFDM. The system 900 includes UE1 data 902, UE2 data 904, and UE3 data 906 being provided to a pre-filtered matrix 908 (P). The P 908 provides an output to a DFT 910 which outputs a UE1 allocation, UE2 allocation, and UE3 allocation 912 to an IDFT 914.

In an eighth embodiment, there may be multiplexing of SSB a with CORESET (e.g., CORESET_0). According to the eighth embodiment, pre-filtered DFT-s-OFDM is used for multiplexing SSB with CORESET_0 using one or more DFTs. However, in both cases, the DFT length is kept the same while a filtering matrix size changes. In one implementation, SSB and CORESET_0 may be multiplexed using a single DFT operation. In another implementation, a single filtering matrix may be specified for a multiplexing pattern and/or for all subcarrier spacing configurations. In a further implementation, different prefiltering matrices are used for different SCSs. In some implementations, multiple pre-filtering matrices are used for each multiplexing pattern and each subcarrier spacing configuration. In certain embodiments, SSBs are generated using DFT-s-OFDM while CORESET_0 is generated using pre-filtered DFT-s-OFDM to get zeros at desired REs where SSB is multiplexed.

Figure 10:
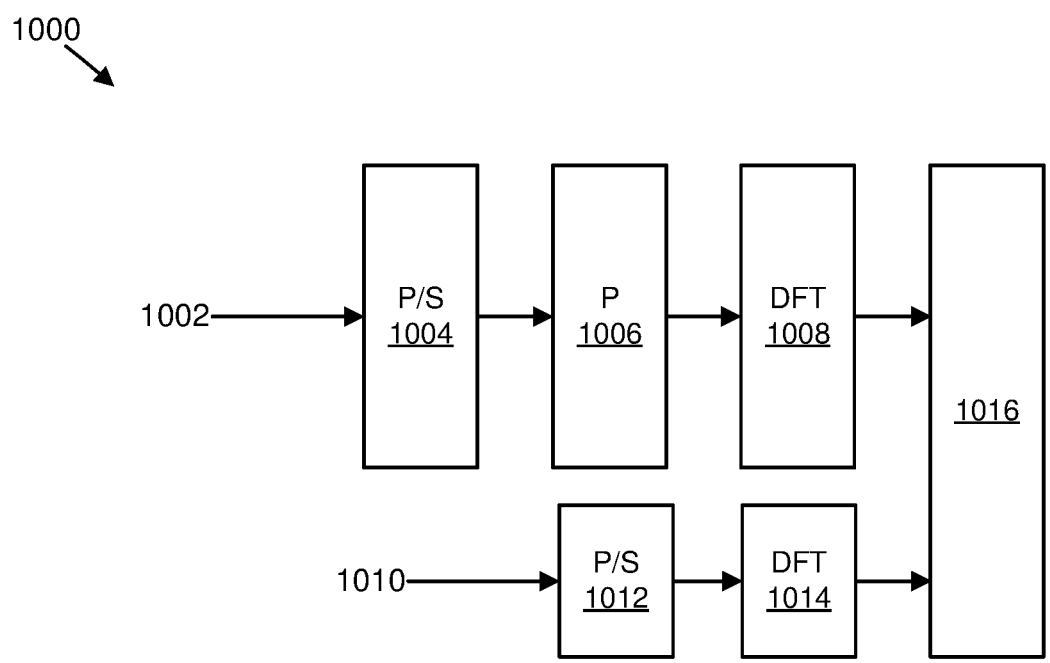
FIG. 10 is a schematic block diagram illustrating one embodiment of a system for multiplexing SSB with DFT-s-OFDM and CORESET_0 with pre-filtered DFT-s-OFDM.

FIG. 10 is a schematic block diagram illustrating one embodiment of a system 1000 for multiplexing SSB with DFT-s-OFDM and CORESET_0 with pre-filtered DFT-s-OFDM. The system 1000 includes CORESET_0 1002 being provided to P/S 1004 which outputs to a pre-filtered matrix 1006 (P). The P 1006 provides an output to a DFT 1008. The system 1000 also includes SSB 1010 being provided to a P/S 1012 which provides an output to a DFT 1014. The DFT 1008 and the DFT 1014 provide outputs that are multiplexed 1016.

Figure 11:
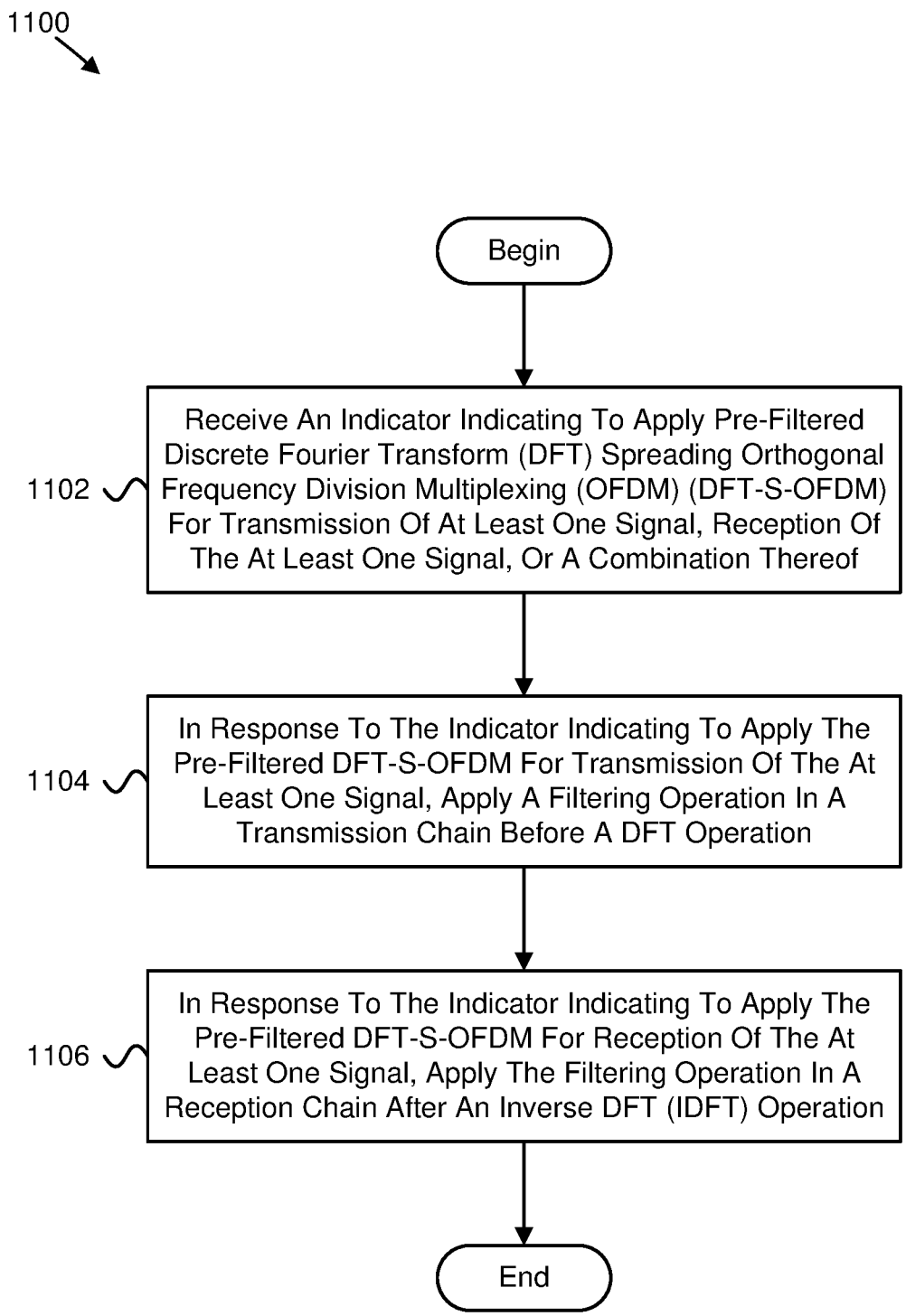
FIG. 11 is a flow chart diagram illustrating one embodiment of a method for applying pre-filtered DFT-s-OFDM.

FIG. 11 is a flow chart diagram illustrating one embodiment of a method 1100 for applying pre-filtered DFT-s-OFDM. In some embodiments, the method 1100 is performed by an apparatus, such as the remote unit 102 and/or the network unit 104. In certain embodiments, the method 1100 may be performed by a processor executing program code, for example, a microcontroller, a microprocessor, a CPU, a GPU, an auxiliary processing unit, a FPGA, or the like.

In various embodiments, the method 1100 includes receiving 1102, at a device, an indicator indicating to apply pre-filtered discrete Fourier transform (DFT) spreading orthogonal frequency division multiplexing (OFDM) (DFT-s-OFDM) for transmission of at least one signal, reception of the at least one signal, or a combination thereof. In some embodiments, the method 1100 includes, in response to the indicator indicating to apply the pre-filtered DFT-s-OFDM for transmission of the at least one signal, applying 1104 a filtering operation in a transmission chain before a DFT operation. In certain embodiments, the method 1100 includes, in response to the indicator indicating to apply the pre-filtered DFT-s-OFDM for reception of the at least one signal, applying 1106 the filtering operation in a reception chain after an inverse DFT (IDFT) operation.

In certain embodiments, applying the filtering operation in the transmission chain before the DFT operation enables frequency domain multiplexing of a physical channel and reference signals. In some embodiments, applying the filtering operation in the transmission chain before the DFT operation enables distributed frequency domain allocation for a physical channel, a physical signal, or a combination thereof. In various embodiments, the filtering operation comprises a filtering matrix that results in zeros at an output of the DFT operation and adds reference symbols at zero positions in a frequency domain.

In one embodiment, the filtering operation comprises a filtering matrix that results in reference symbols in at least one location of an output of the DFT operation. In certain embodiments, applying the filtering operation in the reception chain after the IDFT operation comprises decoding non-contiguous frequency domain allocated physical channels, signals, or a combination thereof. In some embodiments, the filtering operation comprises only one type of pre-filtering matrices for a plurality of multiplexing scenarios.

In various embodiments, the filtering operation comprises a plurality of types of pre-filtering matrices for a plurality of multiplexing scenarios. In one embodiment, the filtering operation comprises a filtering matrix, and the filtering matrix is indicated by downlink control information (DCI), a medium access control (MAC) control element (CE) (MAC CE), radio resource control (RRC) signaling, or some combination thereof. In certain embodiments, the pre-filtered DFT-s-OFDM multiplexes data and a demodulation reference signal (DMRS) in one symbol.

In some embodiments, the filtering operation results in spreading the DMRS across multiple resource blocks (RBs). In various embodiments, control data and a DMRS for a single control resource set (CORESET) are multiplexed in one symbol using a pre-filtered DFT operation. In one embodiment, physical broadcast channel (PBCH) data and DMRS symbols are multiplexed using the pre-filtered DFT-s-OFDM.

In certain embodiments, the pre-filtered DFT-s-OFDM multiplexes a physical downlink shared channel (PDSCH) with a channel state information (CSI) reference signal (RS) (CSI-RS) in one symbol using the DFT operation. In some embodiments, the filtering operation comprises a two-step filtering matrix that generates zeros in at least one location for multiplexing zero power CSI-RS with PDSCH.

In various embodiments, the pre-filtered DFT-s-OFDM multiplexes PUSCH with SRS in one symbol using the DFT operation. In one embodiment, a CORESET and a SSB are multiplexed using the pre-filtered DFT-s-OFDM.

Figure 12:
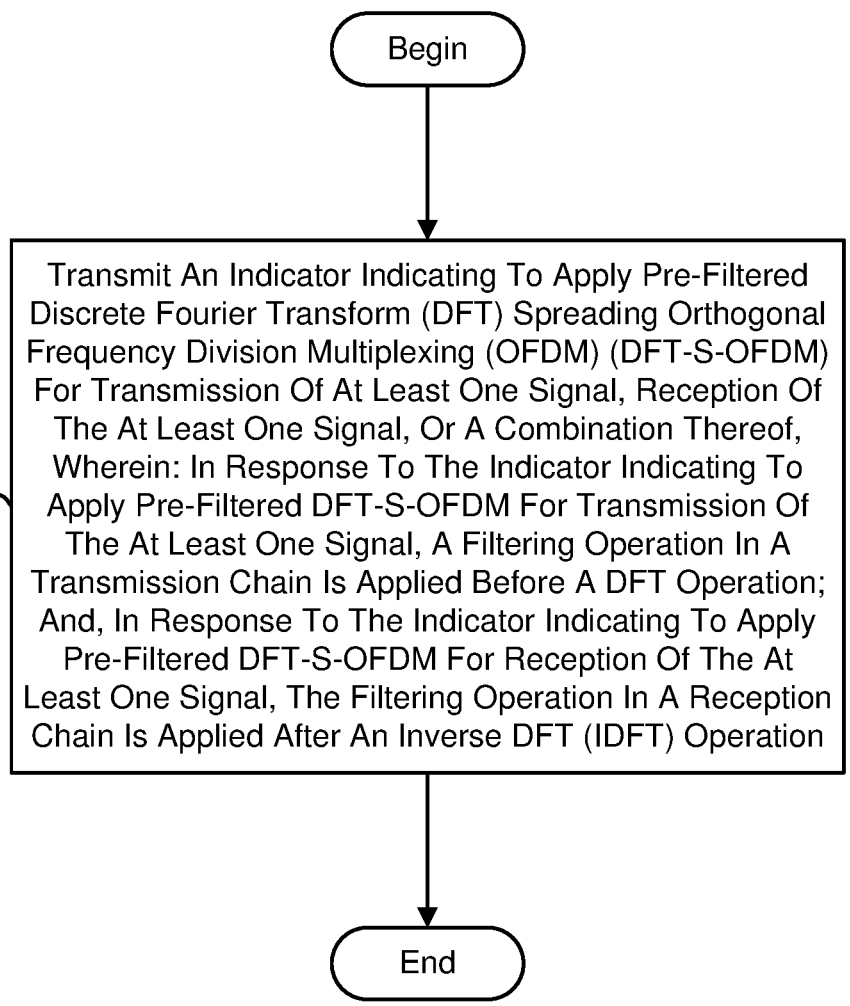
FIG. 12 is a flow chart diagram illustrating another embodiment of a method for applying pre-filtered DFT-s-OFDM.

FIG. 12 is a flow chart diagram illustrating another embodiment of a method 1200 for applying pre-filtered DFT-s-OFDM. In some embodiments, the method 1200 is performed by an apparatus, such as the remote unit 102 and/or the network unit 104. In certain embodiments, the method 1200 may be performed by a processor executing program code, for example, a microcontroller, a microprocessor, a CPU, a GPU, an auxiliary processing unit, a FPGA, or the like.

In various embodiments, the method 1200 includes transmitting 1202, from a device, an indicator indicating to apply pre-filtered discrete Fourier transform (DFT) spreading orthogonal frequency division multiplexing (OFDM) (DFT-s-OFDM) for transmission of at least one signal, reception of the at least one signal, or a combination thereof. In response to the indicator indicating to apply pre-filtered DFT-s-OFDM for transmission of the at least one signal, a filtering operation in a transmission chain is applied before a DFT operation; and, in response to the indicator indicating to apply pre-filtered DFT-s-OFDM for reception of the at least one signal, the filtering operation in a reception chain is applied after an inverse DFT (IDFT) operation.

In certain embodiments, the filtering operation comprises a filtering matrix that results in zeros at an output of the DFT operation and adds reference symbols at zero positions in a frequency domain. In some embodiments, the filtering operation comprises a filtering matrix that results in reference symbols in at least one location of an output of the DFT operation. In various embodiments, the filtering operation comprises only one type of pre-filtering matrices for a plurality of multiplexing scenarios.

In one embodiment, the filtering operation comprises a plurality of types of pre-filtering matrices for a plurality of multiplexing scenarios. In certain embodiments, the filtering operation comprises a filtering matrix, and the filtering matrix is indicated by downlink control information (DCI), a medium access control (MAC) control element (CE) (MAC CE), radio resource control (RRC) signaling, or some combination thereof. In some embodiments, the pre-filtered DFT-s-OFDM multiplexes data and a demodulation reference signal (DMRS) in one symbol.

In various embodiments, the DMRS is spread across multiple resource blocks (RBs). In one embodiment, control data and a DMRS for a single control resource set (CORESET) are multiplexed in one symbol using a pre-filtered DFT operation. In certain embodiments, physical broadcast channel (PBCH) data and DMRS symbols are multiplexed using the pre-filtered DFT-s-OFDM.

In some embodiments, the pre-filtered DFT-s-OFDM multiplexes a physical downlink shared channel (PDSCH) with a channel state information (CSI) reference signal (RS) (CSI-RS) in one symbol using the DFT operation. In various embodiments, the filtering operation comprises a two-step filtering matrix that generates zeros in at least one location for multiplexing zero power CSI-RS with PDSCH.

In one embodiment, the pre-filtered DFT-s-OFDM multiplexes PUSCH with SRS in one symbol using the DFT operation. In certain embodiments, a CORESET and a SSB are multiplexed using the pre-filtered DFT-s-OFDM.

In one embodiment, an apparatus comprises a device. The apparatus further comprises: a receiver that receives an indicator indicating to apply pre-filtered discrete Fourier transform (DFT) spreading orthogonal frequency division multiplexing (OFDM) (DFT-s-OFDM) for transmission of at least one signal, reception of the at least one signal, or a combination thereof; and a processor that: in response to the indicator indicating to apply the pre-filtered DFT-s-OFDM for transmission of the at least one signal, applies a filtering operation in a transmission chain before a DFT operation; and, in response to the indicator indicating to apply the pre-filtered DFT-s-OFDM for reception of the at least one signal, applies the filtering operation in a reception chain after an inverse DFT (IDFT) operation.

In certain embodiments, the processor applying the filtering operation in the transmission chain before the DFT operation enables frequency domain multiplexing of a physical channel and reference signals.

In some embodiments, the processor applying the filtering operation in the transmission chain before the DFT operation enables distributed frequency domain allocation for a physical channel, a physical signal, or a combination thereof.

In various embodiments, the filtering operation comprises a filtering matrix that results in zeros at an output of the DFT operation and adds reference symbols at zero positions in a frequency domain.

In one embodiment, the filtering operation comprises a filtering matrix that results in reference symbols in at least one location of an output of the DFT operation.

In certain embodiments, the processor applying the filtering operation in the reception chain after the IDFT operation comprises the processor decoding non-contiguous frequency domain allocated physical channels, signals, or a combination thereof.

In some embodiments, the filtering operation comprises only one type of pre-filtering matrices for a plurality of multiplexing scenarios.

In various embodiments, the filtering operation comprises a plurality of types of pre-filtering matrices for a plurality of multiplexing scenarios.

In one embodiment, the filtering operation comprises a filtering matrix, and the filtering matrix is indicated by downlink control information (DCI), a medium access control (MAC) control element (CE) (MAC CE), radio resource control (RRC) signaling, or some combination thereof.

In certain embodiments, the pre-filtered DFT-s-OFDM multiplexes data and a demodulation reference signal (DMRS) in one symbol.

In some embodiments, the filtering operation results in spreading the DMRS across multiple resource blocks (RBs).

In various embodiments, control data and a DMRS for a single control resource set (CORESET) are multiplexed in one symbol using a pre-filtered DFT operation.

In one embodiment, physical broadcast channel (PBCH) data and DMRS symbols are multiplexed using the pre-filtered DFT-s-OFDM.

In certain embodiments, the pre-filtered DFT-s-OFDM multiplexes a physical downlink shared channel (PDSCH) with a channel state information (CSI) reference signal (RS) (CSI-RS) in one symbol using the DFT operation.

In some embodiments, the filtering operation comprises a two-step filtering matrix that generates zeros in at least one location for multiplexing zero power CSI-RS with PDSCH.

In various embodiments, the pre-filtered DFT-s-OFDM multiplexes PUSCH with SRS in one symbol using the DFT operation.

In one embodiment, a CORESET and a SSB are multiplexed using the pre-filtered DFT-s-OFDM.

In one embodiment, a method at a device comprises: receiving an indicator indicating to apply pre-filtered discrete Fourier transform (DFT) spreading orthogonal frequency division multiplexing (OFDM) (DFT-s-OFDM) for transmission of at least one signal, reception of the at least one signal, or a combination thereof; in response to the indicator indicating to apply the pre-filtered DFT-s-OFDM for transmission of the at least one signal, applying a filtering operation in a transmission chain before a DFT operation; and in response to the indicator indicating to apply the pre-filtered DFT-s-OFDM for reception of the at least one signal, applying the filtering operation in a reception chain after an inverse DFT (IDFT) operation.

In certain embodiments, applying the filtering operation in the transmission chain before the DFT operation enables frequency domain multiplexing of a physical channel and reference signals.

In some embodiments, applying the filtering operation in the transmission chain before the DFT operation enables distributed frequency domain allocation for a physical channel, a physical signal, or a combination thereof.

In various embodiments, the filtering operation comprises a filtering matrix that results in zeros at an output of the DFT operation and adds reference symbols at zero positions in a frequency domain.

In one embodiment, the filtering operation comprises a filtering matrix that results in reference symbols in at least one location of an output of the DFT operation.

In certain embodiments, applying the filtering operation in the reception chain after the IDFT operation comprises decoding non-contiguous frequency domain allocated physical channels, signals, or a combination thereof.

In some embodiments, the filtering operation comprises only one type of pre-filtering matrices for a plurality of multiplexing scenarios.

In various embodiments, the filtering operation comprises a plurality of types of pre-filtering matrices for a plurality of multiplexing scenarios.

In one embodiment, the filtering operation comprises a filtering matrix, and the filtering matrix is indicated by downlink control information (DCI), a medium access control (MAC) control element (CE) (MAC CE), radio resource control (RRC) signaling, or some combination thereof.

In certain embodiments, the pre-filtered DFT-s-OFDM multiplexes data and a demodulation reference signal (DMRS) in one symbol.

In some embodiments, the filtering operation results in spreading the DMRS across multiple resource blocks (RBs).

In various embodiments, control data and a DMRS for a single control resource set (CORESET) are multiplexed in one symbol using a pre-filtered DFT operation.

In one embodiment, physical broadcast channel (PBCH) data and DMRS symbols are multiplexed using the pre-filtered DFT-s-OFDM.

In certain embodiments, the pre-filtered DFT-s-OFDM multiplexes a physical downlink shared channel (PDSCH) with a channel state information (CSI) reference signal (RS) (CSI-RS) in one symbol using the DFT operation.

In some embodiments, the filtering operation comprises a two-step filtering matrix that generates zeros in at least one location for multiplexing zero power CSI-RS with PDSCH.

In various embodiments, the pre-filtered DFT-s-OFDM multiplexes PUSCH with SRS in one symbol using the DFT operation.

In one embodiment, a CORESET and a SSB are multiplexed using the pre-filtered DFT-s-OFDM.

In one embodiment, an apparatus comprises a device. The apparatus further comprises: a transmitter that transmits an indicator indicating to apply pre-filtered discrete Fourier transform (DFT) spreading orthogonal frequency division multiplexing (OFDM) (DFT-s-OFDM) for transmission of at least one signal, reception of the at least one signal, or a combination thereof, wherein: in response to the indicator indicating to apply pre-filtered DFT-s-OFDM for transmission of the at least one signal, a filtering operation in a transmission chain is applied before a DFT operation; and, in response to the indicator indicating to apply pre-filtered DFT-s-OFDM for reception of the at least one signal, the filtering operation in a reception chain is applied after an inverse DFT (IDFT) operation.

In certain embodiments, the filtering operation comprises a filtering matrix that results in zeros at an output of the DFT operation and adds reference symbols at zero positions in a frequency domain.

In some embodiments, the filtering operation comprises a filtering matrix that results in reference symbols in at least one location of an output of the DFT operation.

In various embodiments, the filtering operation comprises only one type of pre-filtering matrices for a plurality of multiplexing scenarios.

In one embodiment, the filtering operation comprises a plurality of types of pre-filtering matrices for a plurality of multiplexing scenarios.

In certain embodiments, the filtering operation comprises a filtering matrix, and the filtering matrix is indicated by downlink control information (DCI), a medium access control (MAC) control element (CE) (MAC CE), radio resource control (RRC) signaling, or some combination thereof.

In some embodiments, the pre-filtered DFT-s-OFDM multiplexes data and a demodulation reference signal (DMRS) in one symbol.

In various embodiments, the DMRS is spread across multiple resource blocks (RBs).

In one embodiment, control data and a DMRS for a single control resource set (CORESET) are multiplexed in one symbol using a pre-filtered DFT operation.

In certain embodiments, physical broadcast channel (PBCH) data and DMRS symbols are multiplexed using the pre-filtered DFT-s-OFDM.

In some embodiments, the pre-filtered DFT-s-OFDM multiplexes a physical downlink shared channel (PDSCH) with a channel state information (CSI) reference signal (RS) (CSI-RS) in one symbol using the DFT operation.

In various embodiments, the filtering operation comprises a two-step filtering matrix that generates zeros in at least one location for multiplexing zero power CSI-RS with PDSCH.

In one embodiment, the pre-filtered DFT-s-OFDM multiplexes PUSCH with SRS in one symbol using the DFT operation.

In certain embodiments, a CORESET and a SSB are multiplexed using the pre-filtered DFT-s-OFDM.

In one embodiment, a method at a device comprises: transmitting an indicator indicating to apply pre-filtered discrete Fourier transform (DFT) spreading orthogonal frequency division multiplexing (OFDM) (DFT-s-OFDM) for transmission of at least one signal, reception of the at least one signal, or a combination thereof, wherein: in response to the indicator indicating to apply pre-filtered DFT-s-OFDM for transmission of the at least one signal, a filtering operation in a transmission chain is applied before a DFT operation; and, in response to the indicator indicating to apply pre-filtered DFT-s-OFDM for reception of the at least one signal, the filtering operation in a reception chain is applied after an inverse DFT (IDFT) operation.

In certain embodiments, the filtering operation comprises a filtering matrix that results in zeros at an output of the DFT operation and adds reference symbols at zero positions in a frequency domain.

In some embodiments, the filtering operation comprises a filtering matrix that results in reference symbols in at least one location of an output of the DFT operation.

In various embodiments, the filtering operation comprises only one type of pre-filtering matrices for a plurality of multiplexing scenarios.

In one embodiment, the filtering operation comprises a plurality of types of pre-filtering matrices for a plurality of multiplexing scenarios.

In certain embodiments, the filtering operation comprises a filtering matrix, and the filtering matrix is indicated by downlink control information (DCI), a medium access control (MAC) control element (CE) (MAC CE), radio resource control (RRC) signaling, or some combination thereof.

In some embodiments, the pre-filtered DFT-s-OFDM multiplexes data and a demodulation reference signal (DMRS) in one symbol.

In various embodiments, the DMRS is spread across multiple resource blocks (RBs).

In one embodiment, control data and a DMRS for a single control resource set (CORESET) are multiplexed in one symbol using a pre-filtered DFT operation.

In certain embodiments, physical broadcast channel (PBCH) data and DMRS symbols are multiplexed using the pre-filtered DFT-s-OFDM.

In some embodiments, the pre-filtered DFT-s-OFDM multiplexes a physical downlink shared channel (PDSCH) with a channel state information (CSI) reference signal (RS) (CSI-RS) in one symbol using the DFT operation.

In various embodiments, the filtering operation comprises a two-step filtering matrix that generates zeros in at least one location for multiplexing zero power CSI-RS with PDSCH.

In one embodiment, the pre-filtered DFT-s-OFDM multiplexes PUSCH with SRS in one symbol using the DFT operation.

In certain embodiments, a CORESET and a SSB are multiplexed using the pre-filtered DFT-s-OFDM.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:
at least one memory; and
at least one processor coupled with the at least one memory and configured to cause the UE to:
receive an indicator indicating to apply pre-filtered discrete Fourier transform (DFT) spreading orthogonal frequency division multiplexing (OFDM) (DFT-s-OFDM) for transmission of at least one signal, reception of the at least one signal, or a combination thereof;
in response to the indicator indicating to apply the pre-filtered DFT-s-OFDM for transmission of the at least one signal, apply a filtering operation in a transmission chain before a DFT operation; and
in response to the indicator indicating to apply the pre-filtered DFT-s-OFDM for reception of the at least one signal, apply the filtering operation in a reception chain after an inverse DFT (IDFT) operation.

2. The UE of claim 1, wherein the at least one processor is configured to cause the UE to apply the filtering operation in the transmission chain before the DFT operation enables:
frequency domain multiplexing of a physical channel and reference signals; or
distributed frequency domain allocation for a physical channel, a physical signal, or a combination thereof.

3. The UE of claim 1, wherein the filtering operation comprises a filtering matrix that results in:
zeros at an output of the DFT operation and adds reference symbols at zero positions in a frequency domain; or
reference symbols in at least one location of an output of the DFT operation.

4. The UE of claim 1, wherein the at least one processor is configured to cause the UE to apply the filtering operation in the reception chain after the IDFT operation comprises the processor decoding non-contiguous frequency domain allocated physical channels, signals, or a combination thereof.

5. The UE of claim 1, wherein the filtering operation comprises:
only one type of pre-filtering matrices for a plurality of multiplexing scenarios; or
a plurality of types of pre-filtering matrices for a plurality of multiplexing scenarios.

6. The UE of claim 1, wherein the filtering operation comprises a filtering matrix, and the filtering matrix is indicated by downlink control information (DCI), a medium access control (MAC) control element (CE) (MAC CE), radio resource control (RRC) signaling, or some combination thereof.

7. The UE of claim 1, wherein the pre-filtered DFT-s-OFDM multiplexes data and a demodulation reference signal (DMRS) in one symbol, and the filtering operation results in spreading the DMRS across multiple resource blocks (RBs).

8. The UE of claim 1, wherein control data and a demodulation reference signal (DMRS) for a single control resource set (CORESET) are multiplexed in one symbol using a pre-filtered DFT operation.

9. The UE of claim 1, wherein physical broadcast channel (PBCH) data and demodulation reference signal (DMRS) symbols are multiplexed using the pre-filtered DFT-s-OFDM.

10. The UE of claim 1, wherein the pre-filtered DFT-s-OFDM multiplexes a physical downlink shared channel (PDSCH) with a channel state information (CSI) reference signal (RS) (CSI-RS) in one symbol using the DFT operation.

11. The UE of claim 1, wherein the filtering operation comprises a two-step filtering matrix that generates zeros in at least one location for multiplexing zero power channel state information (CSI) reference signal (RS) (CSI-RS) with physical downlink shared channel (PDSCH).

12. The UE of claim 1, wherein the pre-filtered DFT-s-OFDM multiplexes physical uplink shared channel (PUSCH) with sounding reference signal (SRS) in one symbol using the DFT operation.

13. The UE of claim 1, wherein a control resource set (CORESET) and a synchronization signal block (SSB) are multiplexed using the pre-filtered DFT-s-OFDM.

14. A method performed by a user equipment (UE), the method comprising:
receiving an indicator indicating to apply pre-filtered discrete Fourier transform (DFT) spreading orthogonal frequency division multiplexing (OFDM) (DFT-s-OFDM) for transmission of at least one signal, reception of the at least one signal, or a combination thereof;
in response to the indicator indicating to apply the pre-filtered DFT-s-OFDM for transmission of the at least one signal, applying a filtering operation in a transmission chain before a DFT operation; and
in response to the indicator indicating to apply the pre-filtered DFT-s-OFDM for reception of the at least one signal, applying the filtering operation in a reception chain after an inverse DFT (IDFT) operation.

15. A base station, comprising:
at least one memory; and
at least one processor coupled with the at least one memory and configured to cause the base station to:
transmit an indicator indicating to apply pre-filtered discrete Fourier transform (DFT) spreading orthogonal frequency division multiplexing (OFDM) (DFT-s-OFDM) for transmission of at least one signal, reception of the at least one signal, or a combination thereof, wherein:
in response to the indicator indicating to apply pre-filtered DFT-s-OFDM for transmission of the at least one signal, a filtering operation in a transmission chain is applied before a DFT operation; and
in response to the indicator indicating to apply pre-filtered DFT-s-OFDM for reception of the at least one signal, the filtering operation in a reception chain is applied after an inverse DFT (IDFT) operation.

16. A processor for wireless communication, comprising:
at least one controller coupled with at least one memory and configured to cause the processor to:
receive an indicator indicating to apply pre-filtered discrete Fourier transform (DFT) spreading orthogonal frequency division multiplexing (OFDM) (DFT-s-OFDM) for transmission of at least one signal, reception of the at least one signal, or a combination thereof;
in response to the indicator indicating to apply the pre-filtered DFT-s-OFDM for transmission of the at least one signal, apply a filtering operation in a transmission chain before a DFT operation; and
in response to the indicator indicating to apply the pre-filtered DFT-s-OFDM for reception of the at least one signal, apply the filtering operation in a reception chain after an inverse DFT (IDFT) operation.

17. The processor of claim 16, wherein the at least one controller is configured to cause the processor to apply the filtering operation in the transmission chain before the DFT operation enables:
frequency domain multiplexing of a physical channel and reference signals; or
distributed frequency domain allocation for a physical channel, a physical signal, or a combination thereof.

18. The processor of claim 16, wherein the filtering operation comprises a filtering matrix that results in:
zeros at an output of the DFT operation and adds reference symbols at zero positions in a frequency domain; or
reference symbols in at least one location of an output of the DFT operation.

19. The processor of claim 16, wherein the at least one controller is configured to cause the processor to apply the filtering operation in the reception chain after the IDFT operation comprises the processor decoding non-contiguous frequency domain allocated physical channels, signals, or a combination thereof.

20. The processor of claim 16, wherein the filtering operation comprises:
only one type of pre-filtering matrices for a plurality of multiplexing scenarios; or
a plurality of types of pre-filtering matrices for a plurality of multiplexing scenarios.

* * * * *